United States Patent [19]

Dupree

[11] Patent Number: 4,952,107
[45] Date of Patent: Aug. 28, 1990

[54] CAPTIVE PANEL SCREW ASSEMBLY

[75] Inventor: James D. Dupree, South El Monte, Calif.

[73] Assignee: Dupree, Inc., South El Monte, Calif.

[21] Appl. No.: 242,704

[22] Filed: Mar. 11, 1981

[51] Int. Cl.$^5$ .................. F16B 37/04; F16B 39/00; F16B 21/18

[52] U.S. Cl. ................................ 411/103; 411/107; 411/353; 411/508

[58] Field of Search ............. 411/103, 105, 112, 111, 411/360, 352, 15, 57, 150, 149, 531, 534, 353, 113, 173, 175, 179, 182, 107, 508

[56] References Cited

U.S. PATENT DOCUMENTS

| | | |
|---|---|---|
| 2,756,795 | 7/1956 | Clingman ........................ 411/150 |
| 3,037,542 | 6/1962 | Boyd ................................ 411/105 |
| 3,126,935 | 3/1964 | Tuozzo ............................ 411/352 |

FOREIGN PATENT DOCUMENTS

| | | | |
|---|---|---|---|
| 241037 | 4/1960 | Australia ........................ 411/103 |
| 1171209 | 5/1964 | Fed. Rep. of Germany ...... 411/360 |
| 2242981 | 3/1974 | Fed. Rep. of Germany ........ 411/41 |

*Primary Examiner*—Neill Wilson
*Attorney, Agent, or Firm*—Harris, Kern, Wallen & Tinsley

[57] ABSTRACT

A captive screw assembly for an edge lighted panel assembly of the type used in aircraft cockpits and the like. A screw carried in a resilient washer having a lip for retaining the screw and deflectable fingers for insertion into a panel opening for retaining the washer and screw in the panel. Typically the plate carries switches and other components and the panel is attached to the plate by the screws which engage threaded openings in the plate or in nuts carried by the plate.

9 Claims, 1 Drawing Sheet

CAPTIVE PANEL SCREW ASSEMBLY

BACKGROUND OF THE INVENTION

This invention relates to captive panel screw assemblies and in particular to a new and improved captive panel screw washer construction.

Edge lighted panel assemblies are widely used in aircraft cockpits. A typical edge lighted panel assembly includes a front panel made of a clear plastic carrying legends identifying components and functions. This plastic panel is illuminated by miniature lamps positioned at the edges and/or at locations within the panel. Some times the panel is backed with a thin printed circuit to which the lamps are attached. The lighted panel is attached to a metal plate on which switches and other control devices are mounted, with switches and controls projecting through openings in the panel.

The panel is removed from the plate from time to time for inspection and maintenance of the lights, switches and other controls. Screws are used to attach the panel to the support plate and it is desirable to have the screw and associated hardware carried in the panel in some manner so the screws do not become separated and lost during such maintenance operations.

Captive screws and washers have been used in the past, and one such combination is shown in U.S. Pat. No. 3,218,906. It is an object of the present invention to provide a new and improved screw and washer configuration which can be made captive to an edge lighted panel or the like, while permitting ease of attachment and removal of the panel.

A further object is to provide such a fastener configuration which does not require special tools to install nor special tools to use and which minimizes the possibility of damage to the panel on installation and removal. An additional object is to provide such a fastener arrangement which will provide a tight assembly while tolerating a wide mismatch in hole alignment, and one which will provide a cushioned grip which tends to resist loosening resulting from vibration.

These and other objects, advantages, features and results will more fully appear in the course of the following description.

SUMMARY OF THE INVENTION

The invention includes a washer for use with a screw to form a captive panel screw assembly, with the washer formed of a resilient material with a screw receiving passage therethrough and having a lip or the like projecting into the passage for retaining the screw in the passage. The washer has an inner end with a greater outside diameter than the central portion, with the inner end being deflectable inward for insertion through an opening in the panel which opening is of a lesser diameter than the outside diameter of the inner end of the washer, so that the washer is maintained captive by the panel and the screw is maintained captive by the washer.

The invention further includes the combination of washer and screw, the combination of washer, screw and panel, and the combination of washer, screw, panel and plate, with the plate having threaded openings or carrying nuts with threaded openings for receiving the screws.

DESCRIPTION OF THE PREFERRED EMBODIMENT

Figure 1:
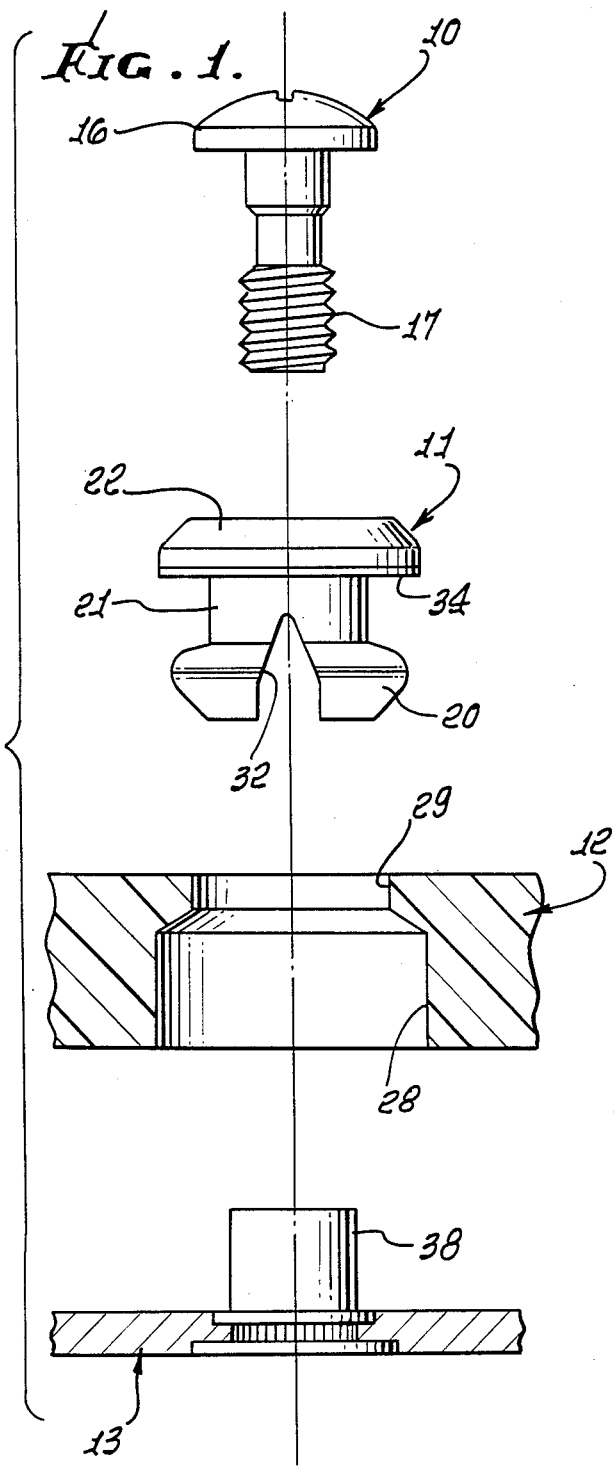
FIG. 1 is an exploded view of a captive screw assembly incorporating the presently preferred embodiment of the invention.

The embodiment illustrated in FIG. 1 includes a screw 10, a captive washer 11, a panel 12, and a plate 13. The screw 10 may be a conventional screw with head 16 and threaded shaft 17. However in the preferred embodiment, a non threaded section is incorporated in the screw between the head and the threaded section. This provides for interference free vertical movement of the loose screw within the washer. In the embodiment illustrated there is a first section adjacent the head of about the pitch diameter of the screw and a second section adjacent the threads of a diameter less than the minor diameter of the threads. This permits use with panels of various thicknesses without interference with the threads of the nut 38.

The captive washer 11 typically is molded of a resilient material, such as nylon, and has an inner end 20, a central portion 21, and an outer end 22. There is a passage 23 through the washer 11 for the screw 10, and means are provided for maintaining the screw captive in the washer. This retaining means preferably is a lip 24 which projects into and partially closes the passage 23, with the inside diameter of the lip being less than the outside diameter of the threads of the screw. This permits the screw to be placed into or threaded into the washer to the position shown in FIG. 2, with the lip functioning to maintain the screw captive in the washer.

Means are provided at the inner end 20 of the washer for maintaining the washer captive in the panel 12. The panel typically is a clear plastic sheet in the order of ⅛ to ¼ inch thick. An opening is provided through the panel for the washer and screw assembly, which opening has a lower portion 28 of a larger diameter and a upper portion 29 of a smaller diameter.

The inner end 20 of the captive washer 11 has a great outside diameter than the central portion 21. Also, this inner outside diameter is greater than the diameter of the opening 29 of the panel, while being less than the diameter of the opening 28. The inner end of the washer is deflectable radially inward so as to reduce the diameter permitting insertion of the inner end of the washer through the opening 29 of the panel Preferably, the inner end of the washer is divided into two or more fingers by slots 32, with four fingers and four slots being shown in the drawing.

Figure 2:
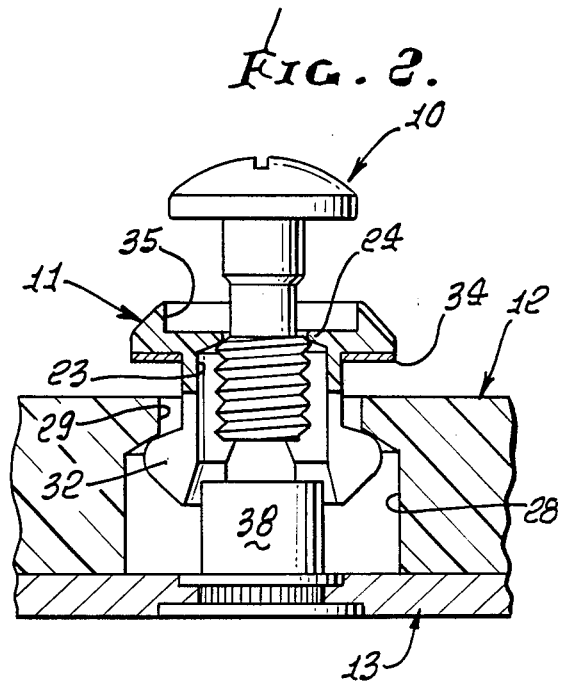
FIG. 2 is a view of the components of FIG. 1 shown assembled in the captive position.

The washer 11 is assembled to the panel 12 by pushing the inner end of the washer through the opening 29, to the position shown in FIG. 2. If desired, a conventional flat washer 34 may be positioned on the central portion of the captive washer 11 prior to inserting the captive washer into the panel. Also, in the embodiment illustrated, the outer end 22 of the washer 11 has a screw head receiving cup 35 for receiving the head 16 of the screw. This configuration provides additional protection to the panel from possible slips of a screwdriver, and provides an improved appearance in some installations. Also, the resilient nature of the captive washer 11 provides a cushioned grip when the screw is tightened which tends to resist loosening of the assembly due to vibration and the like.

Figure 3:
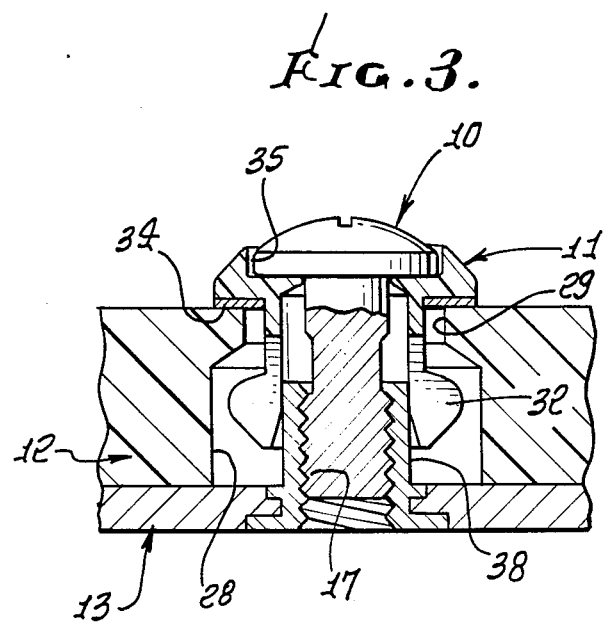
FIG. 3 is a view similar to that of FIG. 2 showing the components in the tightened position.

The plate 13 typically is of aluminum and carries tubular nuts 38 which are staked or otherwise fixed in the plate. The nuts 38 are internally threaded for receiving the screws 10, with the entire assembly shown in FIG. 3.

A typical mode of assembly and use is as follows. The flat washer 34 is pushed over the inner end 20 of the captive washer 11 by deflecting the fingers inward. The screw 10 is then pressed into or threaded into the captive washer 11 past the lip 24. The screw and washer combination is then inserted into the panel 12 by compressing the fingers and pushing the inner end of the washer through the opening 29 and then permitting the inner end to expand in the opening 28. After all of the screw and washer combinations have been inserted in the openings in the panel 12, the panel is now ready for attachment to the plate 13. The opening at the inner end of the washer 11 preferably flares outward. Then when the panel 12 is positioned over the plate 13, the upper end of the tubular nut 38 enters this flared opening and centers the screw over the nut. The screw is then tightened to the position shown in FIG. 3 and the panel is mounted on the plate.

The panel is easily removed from the plate by loosening the screws to the position of FIG. 2, after which the panel can be lifted off. However the screw is maintained captive in the washer and the washer is maintained captive in the panel, so that only the single panel has to be handled. It is readily seen that no special tools are required for installing the screw in the washer or installing the screw and washer in the panel or attaching the panel to the plate. A simple screwdriver will suffice. Also, by having the opening 29 of the panel somewhat greater than the outside diameter of the central portion 21 of the washer 11, a substantial mismatch of holes in the panel with the threaded openings in the plate can be accommodated.

I claim:

1. A washer for use with a screw having a head, a first threaded shaft section, a second shaft section between said head and first section, with said second section of lesser outside diameter than said first section such that said washer and screw form a captive panel screw assembly, said washer being unitary and having an outer end and an inner end with a central portion therebetween, and being formed entirely of a resilient material with a screw receiving passage therethrough, said washer having first lip means adjacent said outer end and projecting into and partially closing said passage for engaging the thread of the screw positioned therein, with said inner end of said washer having a greater outside diameter than said central portion, and with said inner end having second finger means deflectable inward for insertion through a panel opening of diameter less than said inner end outside diameter, and with the axial distance between said washer first lip means and the remote end of said second finger means being greater than the length of said screw first threaded shaft section such that said second finger means can be deflected inward and pass through the panel opening while said screw first threaded shaft section is within said washer screw receiving passage.

2. A washer as defined in claim 1 wherein said inner end is divided into at least two fingers, with said fingers having a normal position with a first outside diameter greater than said central portion and a compressed position with a second outside diameter less than said first outside diameter.

3. A washer as defined in claim 2 including a screw head receiving cup at said outer end.

4. A captive screw assembly comprising in combination:

a screw having a head, a first threaded shaft section, and a second shaft section between said head and first section, with said second section of lesser outside diameter than said first section; and a unitary washer having an inner end and an outer end with a central portion therebetween, and being formed entirely of a resilient material with a screw receiving passage therethrough with said screw positioned therein, said washer having first means adjacent said outer end for retaining said screw in said passage, with the inner end of said washer having a greater outside diameter than said central portion, and with said inner end having second means deflectable inward for insertion through a panel opening of diameter less than said inner end outside diameter, and with the axial distance between said washer first means and the remote end of said second means being greater than the length of said screw first threaded shaft section such that said second means can be deflected inward and pass through the panel opening while said screw first threaded shaft section is within said washer screw receiving passage.

5. A captive screw assembly as defined in claim 4 wherein said inner end is divided into at least two fingers, with said fingers having a normal position with a first outside diameter greater than said central portion and a compressed position with a second outside diameter less than said first outside diameter.

6. A captive screw assembly as defined in claim 4 including a second flat washer having an inside diameter less than said inner end outside diameter and positioned about said central portion.

7. A captive screw assembly as defined in claim 4 including a panel passage therethrough, with said panel passage having a first smaller opening with a diameter less than said washer inner end outside diameter and a second larger opening with a diameter greater than said washer inner end outside diameter, and with said washer positioned in said panel passage with said washer central portion in said first opening and said washer inner end in said second opening.

8. A captive screw assembly as defined in claim 7 including a plate having a threaded opening for receiving said screw threaded shaft.

9. A captive screw assembly as defined in claim 7 including a plate and an upwardly projecting boss carried in said plate, with a threaded opening in said boss for receiving said screw threaded shaft, with said boss positioned within said panel passage second opening.

* * * * *